United States Patent [19]

Taub et al.

[11] 4,055,521

[45] Oct. 25, 1977

[54] CONSTANT BOILING TERNARY COMPOSITIONS AND THE PROCESS FOR USING SUCH COMPOSITIONS IN THE PREPARATION OF POLYURETHANE FOAM

[75] Inventors: Bernard Taub; Robert Leopold Ostrozynski, both of Williamsville, N.Y.

[73] Assignee: Allied Chemical Corporation, Morris Township, N.J.

[21] Appl. No.: 620,664

[22] Filed: Oct. 8, 1975

[51] Int. Cl.$^2$ ............................ C08J 9/14; C09K 3/00
[52] U.S. Cl. ............................ 260/2.5 AF; 252/350; 252/DIG. 9; 260/2.5 BD
[58] Field of Search ........ 260/2.5 A, 2.5 AF, 2.5 BD; 252/DIG. 9, 350

[56] References Cited

U.S. PATENT DOCUMENTS

| | | | |
|---|---|---|---|
| 2,999,817 | 9/1961 | Bower | 252/DIG. 9 |
| 3,249,546 | 5/1966 | Eiseman | 252/DIG. 9 |
| 3,332,881 | 7/1967 | Burt et al. | 252/DIG. 9 |

OTHER PUBLICATIONS

Naturman, Plastics Technology, Oct. 1969, pp. 41 to 47.

*Primary Examiner*—Leland A. Sebastian
*Attorney, Agent, or Firm*—Jay P. Friedenson

[57] ABSTRACT

Constant boiling and essentially constant boiling compositions comprising from about 99 – 72 weight percent trichlorofluoromethane, from about 0.5 – 15 weight percent isopentane and from about 0.5 – 13 weight percent methylene chloride are novel compositions which are particularly useful as blowing agents in the preparation of polyurethane foams.

7 Claims, No Drawings

CONSTANT BOILING TERNARY COMPOSITIONS AND THE PROCESS FOR USING SUCH COMPOSITIONS IN THE PREPARATION OF POLYURETHANE FOAM

This invention relates to novel constant boiling or essentially constant boiling mixtures and to a method of using these compositions as blowing agents in the manufacture of polyurethane foams.

Polyurethane foams have been prepared by reacting a non-linear, slightly-branched polyol with a diisocyanate. For flexible foam, an excess of diisocyanate has been used to provide a sufficient number of isocyanate groups for reaction with water to generate carbon dioxide which expands the polyurethane. The density of the flexible polyurethane foam can be adjusted simply by adjusting the diisocyanate concentration and hence the water level. Unfortunately, however, the higher concentrations of diisocyanate and water produce undesirable changes in the polymer structure of the foam. To avoid this problem, auxiliary blowing agents such as low-boiling solvents are used in controlling foam density. Fluorocarbons such as trichlorofluoromethane have been used commercially as such auxiliary blowing agents for flexible foams and as primary blowing agents for rigid foams. Use of fluorocarbon blowing agents result in a decrease in density in all polyurethane foams and an increase in softness of flexible polyurethane foams.

Methylene chloride is the only auxiliary blowing agent, other than the fluorocarbons, which has been used commercially for flexible urethane foams. Because of its low molecular weight, methylene chloride furnishes more volume of vapor per unit weight. However, its higher boiling point and higher solvency characteristics cause methylene chloride to remain dissolved in the finished foam. The residual methylene chloride is undesirable since only limited amounts of methylene chloride can be used before the foam collapses or excessive shrinking occurs.

One class of low boiling liquids which has been used commercially as the blowing agent in the manufacture of thermoplastic foams such as polystyrene, but not in the production of polyurethane foams, is the hydrocarbons. For example, n-pentane is used in the manufacture of extruded polystyrene and polyethylene foam sheet stock. Because of the lower molecular weight of the low boiling hydrocarbons, they provide more volume of vapor per unit weight. Because of the potential cost savings achievable by using less blowing agent to achieve equivalent foam densities, this characteristic would make the hydrocarbons extremely attractive as blowing agents for polyurethane foams. Hydrocarbons, however, in general have found little or no utility in the production of polyurethane foams, chiefly because of their extreme flammability characteristics and the higher thermal conductivity characteristics as compared with halogenated hydrocarbons.

It is an object of this invention to provide novel blowing agents for polyurethane foams.

A specific object of the invention is to provide novel blowing agents for polyurethane foams which possess superior blowing capacity.

Another object of the invention is to provide a replacement for trichlorofluoromethane blowing agent which is cheaper and yet produces foams with essentially equivalent properties to foam prepared with trichlorofluoromethane.

Other objects and advantages of the invention will become apparent from the following description of the invention.

BRIEF DESCRIPTION OF THE INVENTION

The novel blowing agents are constant boiling, or essentially constant boiling compositions of matter comprising from about 99.0 to about 72.0 weight percent of trichlorofluoromethane, from about 0.5 to about 15 weight percent of isopentane and from about 0.5 to about 13 weight percent methylene chloride. The constant boiling or azeotropic composition comprises about 94.6 weight percent trichlorofluoromethane, about 2.6 weight percent isopentane and about 2.8 weight percent methylene chloride at 760 mm pressure. The process aspects of the invention involve use of the above-described compositions as blowing agents for the preparation of polyurethane foams by reacting and foaming a mixture of ingredients which will react to form a polyurethane foam in the presence of said blowing agent compositions.

DETAILED DESCRIPTION OF THE INVENTION

All of the novel blowing agents of the invention are capable of producing polyurethane foam with good properties. Significantly, such blowing agents have no flash points when measured by the Tag open cup method, despite the presence of a flammable hydrocarbon component.

Another advantageous property of the novel blowing agents is that the resulting foams have been found to possess better insulating properties than are obtainable when water is used as the blowing agent.

Still another advantageous property is that the constant boiling, or essentially constant boiling, characteristics of the blowing agents of the invention permit uniform, flexible foam forming characteristics without leaving residual blowing agent in the foam. This effect is due to the azeotropic nature of the blowing agents, and hence the simultaneous vaporization in a constant proportion of all of the components of the novel blowing agents during the foam forming process.

The novel constant boiling composition or the true azeotrope of the invention has a boiling point of about 23.6° C. at 760 mm Hg pressure and contains about 94.6 weight percent trichlorofluoromethane, about 2.6 weight percent isopentane, and about 2.8 weight percent methylene chloride.

The essentially constant boiling compositions boil between about 23.6° C to about 23.8° C. at 760 mm Hg pressure and contain from about 72.0 weight percent to about 99.0 weight percent trichlorofluoromethane, from about 0.5 weight percent to about 15 weight percent isopentane and from about 0.5 weight percent to about 13 weight percent methylene chloride.

All of the boiling points reported herein were determined by ebulliometry as follows: About 26 ml of sample were placed in a modified Washburn type ebulliometer equipped with a Platinum resistance thermometer standardized at the triple point of water (i.e., 0.010° C.). Heat was applied until the sample came to a boil as indicated by a constant drip rate of condensate from the thermometer well. Boiling was continued until the temperature, recorded continuously on a Leeds and Northrup Speedomax resistance recorder became constant.

The boiling points were then determined from the resistance reading and corrected to 760 mm Hg using the inverted differential from the Clausius-Clapeyron equation to calculate $\Delta T/\Delta P$, i.e., the variance of boiling temperature with respect to pressure.

The essentially constant boiling compositions of the invention, i.e., those compositions other than the true azeotrope, all exhibit uniform foam forming characteristics which is attributable to the fact that such compositions form part of the azeotropic system of the invention.

Certain of the essentially constant boiling compositions have especially valuable properties for the blowing of polyurethane foams in that with such compositions lower density foams can be obtained with less blowing agent than was possible in the prior art with fluorocarbon alone. Furthermore, the foams produced with such blowing agents do not suffer from the detrimental effects obtained when high concentrations of methylene chloride blowing agent is employed. Such preferred compositions also boil between about 23.6° C. and about 23.8° C/ 760 mm Hg pressure and contain from about 75 weight percent to about 83 weight percent trichlorofluoromethane, from about 9 weight percent to about 13 weight percent isopentane and from about 8 weight percent to about 12 weight percent methylene chloride.

The compositions of the invention may be used as auxiliary or primary blowing agents for the preparation of polyurethane foams. Polyurethanes are polymers of polyols and isocyanates. A wide variety of polyols may be employed as disclosed in the prior art, such as polyether polyols and polyester polyols. Illustrative suitable polyether polyols are polyoxypropylene diols having a molecular weight of between about 1,500 and 2,500, glycerol based polyoxypropylene triols having a molecular weight of between about 1,000 and 3,000, trimethylolpropane-based triols having a hydroxyl number of about 390, sorbitol-based hexol having a hydroxyl number of about 490, and sucrose-based octols having a hydroxyl number of about 410. Illustrative suitable polyester polyols are the reaction products of polyfunctional organic carboxylic acids such as succinic acid, adipic acid, phthalic acid and terephthalic acid with monomeric polyhydric alcohols such as glycerol, ethylene glycol, trimethylol propane, and the like.

A wide variety of isocyanate may be employed as disclosed in the prior art. Illustrative suitable isocyanates are the aliphatic isocyanates such as hexamethylene diisocyanate, aromatic isocyanates such as tolylene diisocyanate (TDI), preferably the isomeric mixture containing about 80 weight percent of the 2,4 isomer and 20 weight percent of the 2,6 isomer, crude TDI, curde diphenylmethane diisocyanate and polymethylpolyphenyl isocyanate.

The amount of blowing agent to be employed will depend on whether it is to be used as a primary or auxiliary blowing agent and the nature of the foams desired, i.e., whether flexible or rigid foam is desired.

The amount of blowing agent employed can be readily determined by persons of ordinary skill in the art. Generally, about 1–15 weight percent based on the polyurethane forming reaction mixture is employed and preferably, usually, between about 5–10 weight percent.

As is well known in the art, the urethane-forming reaction requires a catalyst. Any of the well known urethane-forming catalysts may be employed. Illustrative organic catalysts are the amino compounds such as triethylenediamine N,N,N',N'-tetramethylethylenediamine, dimethylethanolamine, triethylamine and N-ethylmorpholine. Inorganic compounds such as the non-basic heavy metal compounds as illustrated by dibutyl tin dilaurate, stannous octoate and manganese acetyl acetonate may also be used as catalysts. In general the amount of catalyst present in the foam forming mixture ranges from about 0.05 to about 2 parts by weight per 100 parts by weight of the polyol component.

As is well recognized in the art, a variety of other additives may be incorporated in the foam-forming mixtures including stabilizers, such as silicone oils; cross-linking agents such as 1,4-butanediol, glycerol, triethanolamine methylenedianiline; plasticizers, such as tricresyl phosphate and dioctyl phthalate; antioxidants; flame retardants; coloring material; fillers; and anti-scorch agents.

Polyurethane foams are prepared according to the invention by reacting and foaming a mixture of ingredients which will react to form the foams in the presence of a blowing agent according to the invention. In practice, the foam forming ingredients are blended, allowed to foam and are then cured to a finished product. The foaming and curing reactions, and conditions therefor are well-known in the art and do not form a part of this invention. Such are more fully described in the prior art relating to the manufacture of polyurethane foams. Thus, for example, the polyether may first be converted to a polyether-polyisocyanate prepolymer by reaction in one or more stages with an excess amount of isocyanate at temperatures from about 75°–125° C. or by reacting the polyol and the isocyanate together at room temperature in the presence of a catalyst for the reaction such as N-methylmorpholine. The prepolymer would then be charged to the foam-forming mixture as the foam producing ingredient with or without the addition of additional isocyanate and foamed in the presence of the blowing agent, optionally with additional polyol crosslinking agents and other conventional optional additives. Heat may be applied to cure the foam. If a prepolymer is not employed, the polyether, isocyanate, blowing agent and other optional additives may be reacted simultaneously to produce the foam in a single stage.

EXAMPLE 1

Determination of Constant Boiling Composition (Azeotrope)

A mixture of 190.86 grams trichlorofluoromethane, 4.46 grams isopentane and 4.68 grams of methylene chloride was fractionally distilled through a 4.5 foot by 13 mm vacuum jacketed fractionation column packed with 0.05 by 0.10 by 0.01 inch stainless steel wire coils, rated at about 90 theoretical plates under optimum conditions. The distillation column was held under total reflux for 6 hours and then about 3 grams of distillate were removed at a reflux ratio of 10:1. Total reflux conditions were then maintained for another 18 hours after which another 3 grams of distillate were removed at the 10:1 reflux ratio. Once again the distillation column was put on total reflux for another 24 hours and then 35 grams of distillate were removed at the 10:1 reflux ratio. Boiling point data and composition data are summarized in Table I.

TABLE I

| Conditions | Trichlorofluoro-methane, Wt. % | Isopentane Wt. % | Methylene Chloride, Wt. % | Boiling Point ° C/760 mm |
| --- | --- | --- | --- | --- |
| Original Charge | 95.43 | 2.23 | 2.34 | |
| 6 Hours Total Reflux | 94.58 | 2.64 | 2.78 | |
| 24 Hours Total Reflux | 94.65 | 2.61 | 2.74 | |
| 48 Hours Total Reflux | 94.62 | 2.61 | 2.77 | 23.61 |

As illustrated by this example, the composition of the azeotrope of this invention is about 94.6 weight percent trichlorofluoromethane, 2.6 weight percent isopentane and 2.8 weight percent methylene chloride.

EXAMPLE 2

Essentially Constant Boiling Compositions

The boiling temperatures of various mixtures of trichlorofluoromethane, isopentane and methylene chloride were measured. The boiling temperatures were taken at the initial time that boiling began, at the time that 50 percent of the mixture remained and just prior to complete evaporation of the mixture. The results are shown in Table II. Since none of the boiling temperatures varied more than 0.1° C. from the boiling temperature when 50 percent of the mixture remained, only that boiling point is shown in Table II. The boiling points of the separate components are also shown.

TABLE II

| Isopentane Wt. % | Trichlorofluoro Methane Wt. % | Methylene Chloride Wt. % | Boiling Point ° C |
| --- | --- | --- | --- |
| 0 | 100 | 0 | 23.8 |
| 3 | 94 | 3 | 23.61 |
| 11 | 82 | 7 | 23.70 |
| 11 | 80 | 9 | 23.70 |
| 12 | 78 | 10 | 23.70 |
| 13 | 74 | 13 | 23.8 |
| 0 | 0 | 100 | 40.1 |
| 100 | 0 | 0 | 28.0 |

This example identifies the range of essentially constant boiling compositions of the invention. It can be seen from these data as well as that in Table I that the demonstrated range of essentially constant boiling compositions in accordance with the invention comprises from about 94.6 to about 74.0 weight percent trichlorofluoromethane, from about 2.6 to about 13 weight percent isopentane and from about 0.5 to 15 weight percent methylene chloride.

EXAMPLE 3

Constant Boiling Characteristics

A blend of 76.9 weight percent trichlorofluoromethane, 11.7 weight percent isopentane and 11.4 weight percent methylene chloride was fractionally distilled through the fractionation column described in Example 1 while holding the column at reflux. Essentially all of the initial charge was collected through the column in four approximately equal fractions. The results of the fractional distillation are shown in Table III.

TABLE III

| | Initial | Fraction #1 | #2 | #3 | #4 | Residue |
| --- | --- | --- | --- | --- | --- | --- |
| Weight of Initial Charge, % | 100% | 21.6 | 22.2 | 26.5 | 15.8 | — |
| Cumulative Weight % | 0 | 21.6 | 43.8 | 70.3 | 86.1 | — |
| Boiling Point ° C/760 mm | | 23.70 | 23.71 | 23.72 | 23.82 | — |
| Composition, Wt. % | | | | | | |
| Trichlorofluoromethane | 76.9 | 79.60 | 79.61 | 78.52 | 74.44 | 46.9 |
| Isopentane | 11.7 | 11.44 | 11.32 | 12.34 | 12.88 | 7.0 |
| Methylene Chloride | 11.4 | 8.96 | 9.07 | 9.14 | 12.68 | 46.1 |

The results summarized in Table III indicate that up to about 50 percent of the distillation yields a constant boiling mixture whose composition change is essentially negligible. Continued fractionation shows that although the distillate compositions begins to change, the boiling points of the various fractions remain essentially constant.

EXAMPLE 4

Non-Flammability Characteristics

The flash point of various mixtures of trichlorofluoromethane, isopentane and methylene chloride were measured by the Tag open cup method, ASTM-D-1310. The results obtained are shown in Table IV.

TABLE IV

| Isopentane Wt. % | Trichlorofluoro-methane-Wt. % | Methylene Chloride-Wt. % | Flash Point ° F |
| --- | --- | --- | --- |
| 0 | 100 | 0 | None |
| 3 | 94 | 3 | None |
| 9 | 79 | 12 | None |
| 12 | 83 | 5 | None |
| 12 | 78 | 10 | None |
| 12 | 75 | 13 | None |
| 16 | 75 | 9 | Flashes when almost dry |
| 18 | 77 | 5 | 24 |
| 18 | 57 | 25 | −29 |
| 0 | 0 | 100 | None |

This example clearly illustrates the non-flammable characteristics of the compositions of the invention.

EXAMPLE 5

Blowing Capacities 100 parts by weight of Thanol RS-700 (a polypropylene oxide adduct of sorbitol with a hydroxyl number of 480–500 supplied by Jefferson Chemical Co.), 2 parts by weight of a 33 weight percent solution of triethylenediamine in dipropyleneglycol, 2 parts by weight of dimethylethanolamine, 2.5 parts by weight of Silicone DC-193 (a silicone cell control additive supplied by Dow Corning Corporation) and 40 parts by weight of a blowing agent were combined into a premix. 132 parts by weight of polymethylenepolyphenyl isocyanate with an amine equivalent of 133.5 and functionality of 2.8 supplied by Upjohn Corporation were then added and the mixture was agitated at high speed for 45 seconds and poured into a paper container and allowed to foam After curing at room temperature for 16 hours, foam density was determined. The experiment was repeated with several different blowing agents. The blowing agents used and the results are summarized in Table V. In the Table, replacement factor refers to the property of a given blowing agent to produce essentially equivalent density of foam when the indicated lesser percentage of blowing agent is employed, compared to trichlorofluoromethane as blowing agent.

TABLE V

| | Ternary Blend | | | |
|---|---|---|---|---|
| Trichloro-fluoromethane Wt. % | Isopentane Wt. % | Methylene Chloride, Wt. % | Density lbs/cu ft. (g/cu cm) | Replacement Factor Wt. % |
| 100 | 0 | 0 | 1.95 (0312) | — |
| 83 | 12 | 5 | 1.65 (.0264) | 15 |
| 79 | 9 | 12 | 1.59 (.0255) | 19 |
| 78 | 12 | 10 | 1.54 (.0247) | 21 |

The results of this example as summarized in Table V indicate the increased blowing capacities of the various trichlorofluoroethane, isopentane and methylene chloride blends over trichlorofluoromethane alone.

EXAMPLE 6

Evaluation of Flexible Foam 100 parts by weight of Voranol CP-3000 (a polyether triol of 3000 molecular weight having a hydroxyl number of 56 supplied by Dow Chemical Corporation), 3.4 parts by weight of water, 0.3 part by weight of a 33 percent solution of triethylenediamine in dipropylene glycol, and 2.4 parts by weight of a ternary blend consisting of 78 weight percent trichlorofluoromethane, 12 weight percent isopentane and 10 weight percent methylene chloride, were pre-mixed and then metered as one stream, together with 0.26 parts by weight of stannous octoate in 2.6 parts by weight of dioctyl phthalate as a second stream and with 44.1 parts by weight of a mixture of tolylene diisocyanates (TDI) consisting of 80 weight percent 2,4 TDI and 20 weight percent 2,6 TDI as a third stream. The mixture was then allowed to foam and cure for 1 week before testing. As a control, the same system was prepared except that 3.0 parts of trichlorofluoromethane were used as the blowing agent. Properties of the foams are summarized in Table VI.

TABLE VI

| Properties | Ternary Blend | | Trichloro-fluoromethane | |
|---|---|---|---|---|
| Density, lbs/cu ft (g/cu cm) | 1.55 | (.025) | 1.53 | (.025) |
| Tensile Strength, psi (Kg/sq in) | 15.1 | (73.72) | 14.1 | (68.84) |
| Elongation, % | 175 | | 175 | |
| Tear Strength, lbs/in (gm/cm) | 1.6 | (285.8) | 1.7 | (303.6) |
| Resilience, % | 46 | | 47 | |
| Air FLow, cu. ft/min (liters/sec) | 2.30 | (1.09) | 2.56 | (1.21) |

TABLE VI-continued

| Properties | Ternary Blend | | Trichloro-fluoromethane | |
|---|---|---|---|---|
| Compression Set at 90%, % | 4 | | 4 | |
| Compression Set at 50%, % | 3 | | 3 | |
| Compression Set at 50%, Humid Aged, % | 6 | | 5 | |
| Indentation Load Deflection: | | | | |
| at 25%, lb (Kg) | 36.5 | (16.56) | 33.0 | (14.97) |
| at 65%, lb (Kg) | 71.6 | (32.48) | 67.7 | (30.71) |
| at 25% Return (%) | 27.0 | (12.25) | 25.0 | (11.34) |

The results summarized in Table VI indicate that essentially equivalent foams are obtained when 20 weight percent less of blowing agent is used when the blowing agent is the ternary blend blowing agent rather than trichlorofluoromethane.

EXAMPLE 6

Evaluation for Rigid Foam 100 parts by weight of Pluracol 595 (a propylene oxide adduct of a mixture of ethylene diamine and toluene diamine having a hydroxyl number of 415, a molecular weight of 538, a viscosity at 150° F of 440 cps and a functionality of 4, supplied by BASF Wyandotte) were blended with 1.5 parts by weight of Silicone L-5340 (a silicone cell control agent), 2.35 parts by weight of Dabco 33LV (a 33 percent solution of triethylene diamine in dipropylene glycol supplied by Air Products Inc.), 43 parts by weight of trichlorofluoromethane, and 86.5 parts by weight of Nacconate 5050 (crude toluene diisocyanate having an amine equivalent of 107 supplied by Allied Chemical Corporation). The blend was then poured into a suitable paper container and allowed to foam. The foam was then allowed to cure for 1 week before testing. The results of the test are shown in column 1 of Table VII below. The procedure was then repeated using 36.6 parts by weight, a 15 weight percent reduction from the amount of trichlorofluoromethane originally used, of a blend containing 83 weight percent trichlorofluoromethane, 12 weight percent isopentane and 5 weight percent methylene chloride. The results are shown in column 2 of Table VII below. The procedure was then repeated using 34.4 parts by weight, a 20 weight percent reduction from the amount of trichlorofluoromethane originally used, of a blend containing 78 weight percent trichlorofluoromethane, 10 weight percent isopentane, and 12 weight percent methylene chloride. The results are shown in column 3 of Table VII below. The results shown in the Table indicate that substantially less of the ternary blend of blowing agents can be used than the trichlorofluoromethane blowing agent while still obtaining foams having equivalent properties.

TABLE VII

| Composition | 1 | 2 | 3 |
|---|---|---|---|
| Pluracol 595 | 100.0 | 100.0 | 100.0 |
| Silicone L-5340 | 1.5 | 1.5 | 1.5 |
| Dabco 33LV | 2.35 | 2.35 | 2.35 |
| Fluorocarbon 11(1) | 43.0 | — | — |
| Ternary Blend (A)(2) | — | 36.6 | — |
| Ternary Blend (B)(3) | — | — | 34.4 |
| Nacconate 5050 | 86.5 | 86.5 | 86.5 |
| Density, lbs/cu. ft. (gms/cu. cm) | 1.4 (.022) | 1.4 (.022) | 1.5 (.024) |
| Closed Cells, % | 97 | 94 | 84 |
| K-Factor* | 0.145 $2.09 \times 10^{-4}$ | 0.149 $2.15 \times 10^{-4}$ | 0.147 $2.12 \times 10^{-4}$ |

(1)Trichlorofluoromethane
(2)Trichlorofluoromethane/isopentane/methylene chloride 83/12/5
(3)Trichlorofluoromethane/isopentane/methylene chloride 78/10/12 K-Factor is TABLE VII-continued

| Composition | 1 | 2 | 3 |
|---|---|---|---| the thermal conductivity in BTU's/(hr)(ft²)(° F/in). Metric thermal conductivity in Joules/(sec) (cm²) (° C/cm) =
*K-Factor times $1.442 \times 10^{-3}$.

We claim:

1. A composition of matter comprising from about 94.6 to about 74.0 weight percent trichlorofluoromethane, from about 2.6 to about 13 weight percent isopentane and from about 2.8 to about 13 weight percent methylene chloride.

2. A composition of matter as defined in claim 1 comprising from about 75 to about 83 weight percent trichlorofluoromethane, from about 9 to about 13 weight percent isopentane and from about 8 to about 12 weight percent methylene chloride.

3. A composition of matter as defined in claim 1 comprising about 94.6 weight percent trichlorofluoromethane, about 2.6 weight percent isopentane and about 2.8 weight percent methylene chloride.

4. A composition of matter as defined in claim 1 comprising about 78 weight percent trichlorofluoromethane, about 12 weight percent isopentane and about 10 weight percent methylene chloride.

5. The process for preparing polyurethane foam which comprises reacting and foaming a mixture of ingredients which will react to form a polyurethane foam in the presence of a blowing agent comprising the composition of claim 1.

6. The process for preparing polyurethane foam which comprises reacting and foaming a mixture of ingredients which will react to form a polyurethane foam in the presence of a blowing agent comprising the composition of claim 2.

7. The process for preparing polyurethane foam which comprises reacting and foaming a mixture of ingredients which will react to form a polyurethane foam in the presence of a blowing agent comprising the composition of claim 4.

* * * * *